United States Patent
Schmidt et al.

(10) Patent No.: US 12,119,604 B2
(45) Date of Patent: Oct. 15, 2024

(54) DEVICE FOR ELECTRICALLY CONDUCTIVE CONNECTING OF CONDUCTORS WITH A RETAINING DEVICE

(71) Applicant: SCHUNK SONOSYSTEMS GMBH, Wettenberg (DE)

(72) Inventors: Reiner Schmidt, Lollar-Ruttershausen (DE); Udo Wagenbach, Buseck (DE); Bastian Gilbert, Heuchelheim (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 44 days.

(21) Appl. No.: 17/812,477

(22) Filed: Jul. 14, 2022

(65) Prior Publication Data
US 2022/0368094 A1   Nov. 17, 2022

Related U.S. Application Data (62) Division of application No. 16/622,440, filed as application No. PCT/EP2018/066470 on Jun. 20, 2018.

(30) Foreign Application Priority Data

Jun. 27, 2017   (DE) ...................... 10 2017 114 182.0

(51) Int. Cl.
*B23K 20/10* (2006.01)
*H01R 4/02* (2006.01)
(Continued)

(52) U.S. Cl.
CPC ......... *H01R 43/0207* (2013.01); *B23K 20/10* (2013.01); *B23K 20/106* (2013.01);
(Continued)

(58) Field of Classification Search
None
See application file for complete search history.

(56) References Cited

U.S. PATENT DOCUMENTS 4,596,352 A * 6/1986 Knapp ................ B23K 20/106
228/1.1
4,867,370 A * 9/1989 Welter ................ B23K 20/106
228/110.1
(Continued)

FOREIGN PATENT DOCUMENTS

CN   1871096 A   11/2006
CN   1902022 A   1/2007
(Continued)

OTHER PUBLICATIONS

International Search Report dated Oct. 30, 2018, in PCT/EP2018/066470.
(Continued)

*Primary Examiner* — Devang R Patel
(74) *Attorney, Agent, or Firm* — LADAS & PARRY LLP; Malcolm J. MacDonald, Esq.

(57) ABSTRACT

The invention relates to a device for electrically conductive connecting, by means of ultrasonic welding, of first electric conductors (140, 142) and second electric conductors (144, 146) in a compression space the cross section of which can be changed and which comprises at least one lateral slide, a sonotrode and a counter electrode, wherein firstly, blank ends of the first electric conductors (140, 142) are introduced into the compression space and are welded by means of ultrasonic action to form a first connection (148) and then after the first connection has been removed from the compression space, blank ends of the second electric conductors (144, 146) are introduced into same and are welded by means of ultrasonic action to form a second connection,
(Continued)

wherein the first connection is fed to a retaining device (182, 184) before the second connection is welded.

11 Claims, 13 Drawing Sheets

(51) Int. Cl.
*H01R 43/02* (2006.01)
*B23K 101/32* (2006.01)
*B23K 101/38* (2006.01)

(52) U.S. Cl.
CPC .......... *H01R 4/021* (2013.01); *B23K 2101/32* (2018.08); *B23K 2101/38* (2018.08)

(56) References Cited

U.S. PATENT DOCUMENTS

| | | | | |
|---|---|---|---|---|
| 4,869,419 | A * | 9/1989 | Nuss | B23K 20/106 |
| | | | | 228/110.1 |
| 5,906,044 | A | 5/1999 | Fujii et al. | |
| 5,941,443 | A * | 8/1999 | Steiner | B23K 20/10 |
| | | | | 228/1.1 |
| 6,299,052 | B1 * | 10/2001 | Wnek | B23K 20/10 |
| | | | | 228/110.1 |
| 7,459,653 | B2 * | 12/2008 | Steiner | B23K 11/0026 |
| | | | | 219/56 |
| 7,533,791 | B2 * | 5/2009 | Steiner | B23K 20/10 |
| | | | | 228/1.1 |
| 8,870,052 | B2 | 10/2014 | Ruhl et al. | |
| 2007/0000890 | A1 | 1/2007 | Steiner et al. | |
| 2008/0265004 | A1 | 10/2008 | Stroh | |
| 2013/0146644 | A1 | 6/2013 | Ruhl et al. | |
| 2014/0374466 | A1 | 12/2014 | Coto | |

FOREIGN PATENT DOCUMENTS

| | | | | |
|---|---|---|---|---|
| GB | 2171945 | A * | 9/1986 | ........... B23K 20/106 |
| JP | S52-127435 | | 10/1977 | |
| JP | H10-193138 | A | 7/1998 | |
| WO | 2014/161715 | A1 | 10/2014 | |

OTHER PUBLICATIONS

Chinese Office Action, dated Dec. 22, 2020, for Chinese Application No. 201880043584.7.

Japanese Office Action, dated Mar. 1, 2022, corresponding to Japanese Application No. 2019-570537.

* cited by examiner

DEVICE FOR ELECTRICALLY CONDUCTIVE CONNECTING OF CONDUCTORS WITH A RETAINING DEVICE

This is a divisional application of U.S. application Ser. No. 16/622,440, filed Dec. 13, 2019, which is a 371 of International Application No. PCT/EP2018/066470, filed Jun. 20, 2018, which claims priority to German Patent Application No. 10 2017 114 182.0, filed Jun. 27, 2017, the contents of all of which are incorporated herein by reference.

The invention relates to a method for electrically conductive connecting, by means of ultrasonic welding, of first electric conductors and second electric conductors twisted with said first electric conductors in a compression space the cross section of which can be changed particularly in terms of height and width and which is delimited by at least one lateral slide, a sonotrode and a counter electrode, wherein firstly, blank ends of the first electric conductors are introduced into the compression space and are welded by means of ultrasonic action to form a first connection and then after the first connection has been removed from the compression space, blank ends of the second electric conductors are introduced into said same and are welded by means of ultrasonic action to form a second connection.

Furthermore, the invention relates to an arrangement for firmly bonded connecting, by means of ultrasound, of first conductors as well as second conductors which, in particular, are twisted together, which comprises a compression space which is delimited by at least one lateral slide, a sonotrode and a counter electrode, and which, during the welding, is preferably surrounded by a housing, in particular a sound-insulating housing.

In order to connect electrical conductors in a firmly bonded manner, ultrasound welding can be used. Here, the energy necessary for the welding is introduced in the form of mechanical oscillations into the weld metal. For this purpose, a sonotrode is set in ultrasonic oscillation in its longitudinal direction. At the same time, a relative movement occurs with respect to a counter electrode—also referred to as anvil—associated with the sonotrode, in order to apply a necessary static welding force. Between counter electrode and sonotrode, the materials to be joined are arranged. In ultrasound metal welding, the mechanical oscillations can be introduced parallel to the plane spanned by the anvil. Here, a complex relation develops between the static force acting between sonotrode and counter electrode, the oscillating shear forces, and a temperature increase in the joining zone. Typical frequencies during ultrasound metal welding are between 20 kHz and 40 kHz, wherein, usually, the operating frequency is in the area of 20 kHz.

In particular in communication technology but also, for example, in cable harnesses in motor vehicles, twisted lines are used, in order to reduce a mutual influencing of the individual electrical conductors or cables, which are insulated from one another. Connections between sections of individual conductors or cables can be made by means of ultrasound metal welding, wherein the connections produced can also be referred to as passage nodes.

In order to keep the electrical influencing of conductors comprising passage nodes as low as possible, to the extent possible, twisting should also be present in the area of the passage node. However, since the passage nodes have to be welded one after the other, in order to exclude an impeding of the welding by an already welded passage node, said passage node has to be kept at a distance from the compression space. Since during welding the compression space or the components delimiting said compression space usually have to be surrounded by a sound protection hood, an untwisting occurs to an extent that the already welded passage node extends outside of the sound protection hood. However, this requires an untwisting of the conductors to a considerable extent.

DE 10 2010 060 767 A1 discloses a method and a device for welding lines consisting of metallic braids or strands in order to form an end or passage node by introducing in each case a first section of each line into a compression space of an ultrasound welding device with a sonotrode and a counter electrode.

The present invention is based on the aim of further developing a method and an arrangement of the type mentioned at the beginning, such that a twisting is largely enabled in the area of a connection between the first conductors and of a connection between the second conductors.

According to the method, to achieve the aim, it is substantially proposed that, before the welding of the second connection, the first connection is fed to a retention device located in the immediate vicinity of the compression space.

In other words, according to the invention, it is proposed that the welded first connection, that is to say the first passage node, is accommodated by a retention device which is located in the immediate vicinity of the compression space. This ensures that untwisting or twisting is necessary to a small extent in order to carry out the welding of the sections of the additional conductor or cable without impediment.

Naturally, the teaching according to the invention also applies to the welding of more than two twisted conductors extending on each side of the compression space.

The retention device is located here within the sound protection housing, to the extent that such a housing is present.

In particular, it is provided that the retention device is formed in or on the lateral slide, the counter electrode or in or on the housing interior.

The possibility exists that the retention device starts from sections of the housing interior or of an element enclosing the housing on the bottom side, such as a bottom plate, from which indirectly or directly components of the ultrasound welding device start.

Based on the teaching according to the invention, it is achievable that the untwisting length on both sides of the compression space can be reduced in each case to approximately 30 mm to 40 mm. As mentioned, this results in the advantage that the mutual influencing of the electrical conductors or cables is reduced; indeed, the shorter the untwisting length is, the better the electromagnetic compatibility of the cable set is with regard to susceptibility to failure of the entire cable harness.

An arrangement of the type mentioned at the beginning is characterized substantially by a retention device for accommodating a first connection produced by welding of blank ends of the first conductors, during the welding of the blank ends of the second conductors to form a second connection, wherein the retention device extends on the lateral slide or on the counter electrode or, in the case of presence of the housing, in its interior, in particular it starts therefrom or from an element closing the housing on the bottom side.

In particular, the retention device is formed as at least one element from the group consisting of recess, protrusion, bracket, hook, clamping device, gripping element, spring, downholder.

The invention can also provide that, in the upper side of the lateral slide, which is located at a distance from the bottom surface of the compression space, a recess is formed as retention device. In particular, in a cross section perpendicular to the front surface of the lateral slide delimiting the compression space, the recess has a geometry in the form of a triangle, in particular a non-isosceles triangle, a rectangle, a segment of a circle, in particular a semicircle, or one or more combinations thereof. The recess can also be formed as an undercut.

Alternatively or additionally, above the upper side of the lateral slide, a protrusion which is rectangular or L-shaped in cross section can protrude as the retention device, which, in particular on the compression space side, transitions flush into the front surface of the lateral slide delimiting the compression space.

However, the possibility also exists to form a recess in the front surface of the counter electrode facing the lateral slide, or to allow a protrusion, as the retention device, to start from the front surface. Here, it is provided in particular that, on the compression space side, the protrusion transitions flush into the surface of the counter electrode delimiting the compression space, as section of same.

However, the retention device can also start from the housing or from a section of said housing. For example, the housing can comprise a stationary first section and a second section which is adjustable relative to said stationary first section and which preferably adjoins same during the welding, wherein, starting from the first or second section is at least one protrusion, in particular a hook-shaped protrusion, which forms the retention device.

However, it is provided in particular that two spaced retention devices, as protrusions, start from the first or second section of the housing and extend on opposite sides of the compression space.

Naturally, a retention device can also start from the base which accommodates the components of the ultrasound welding device and which closes the sound protection housing on the bottom side.

Additional details, advantages and features of the invention result not only from the claims, the features to be obtained therefrom—individually and/or in combinations—, but also from the following description of preferred embodiment examples which can be taken from the drawing.

Based on the figures, in which basically identical elements are provided with identical reference numerals, the teaching according to the invention is explained, by means of which individual conductors or cables which are twisted together can be welded, without any untwisting or twisting occurring in the area of the connections, so that a mutual influencing of the electrical conductors or cables is reduced.

This is of particular interest in the sector of communication technology, but also in the motor vehicle sector. The avoided mutual influencing here has a positive effect particularly in a cable harness of a motor vehicle, since the susceptibility to failure of the cable harness is reduced.

Figure 1:
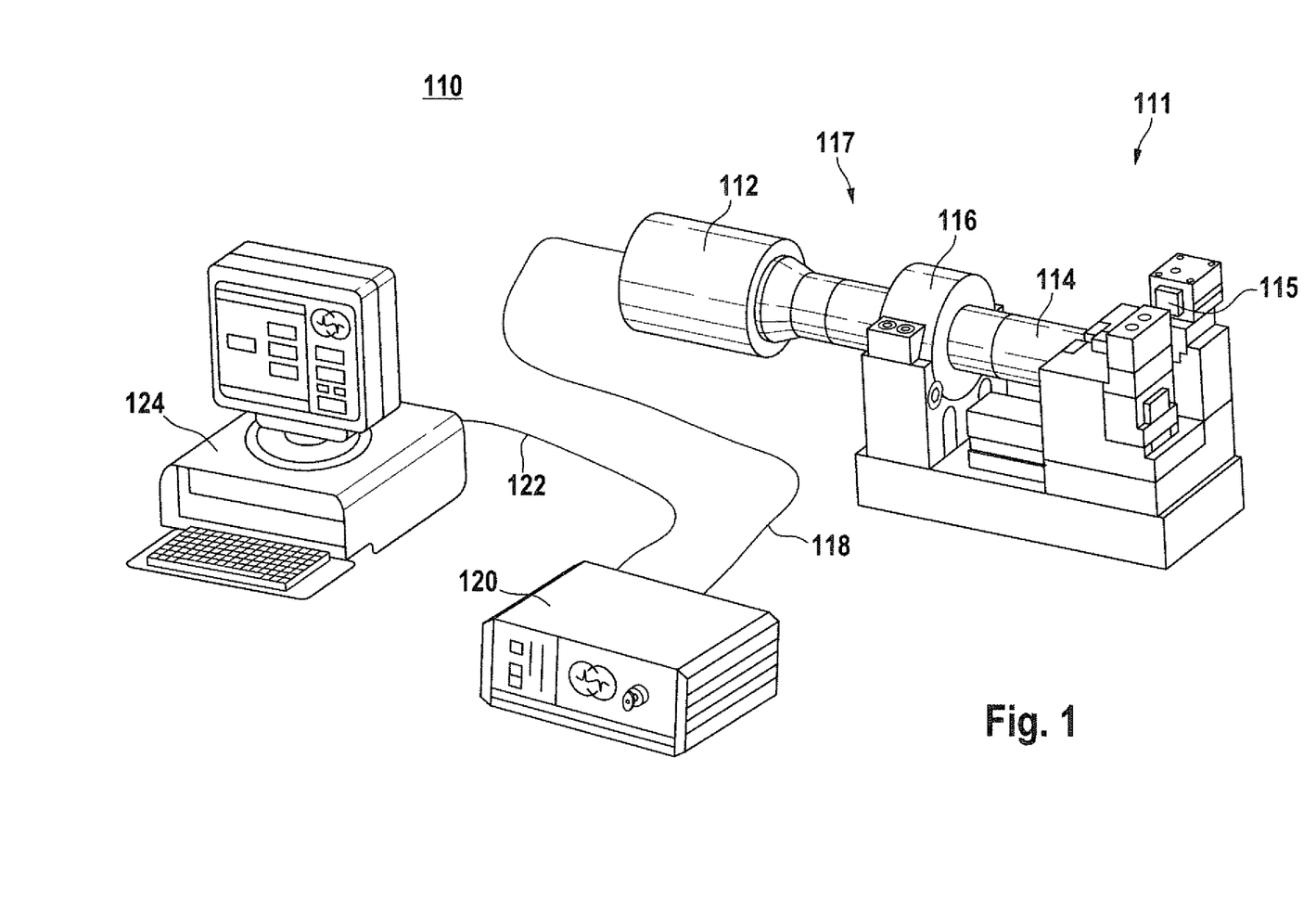
FIG. 1 shows a schematic diagram of an ultrasound metal welding arrangement.

FIG. 1 is a purely schematic diagram of an ultrasound welding arrangement 110 intended to explain essential elements. The arrangement 110 comprises an ultrasound metal welding device 111 which is intended for welding conductors or cables.

The ultrasound welding arrangement 110 comprises, as essential elements, a converter 112 and a sonotrode 114, between which a booster for amplitude amplification is arranged. The converter 112, the booster 116 and the sonotrode 114 form a so-called ultrasonic oscillator 117 which is mounted in the booster. Associated with the sonotrode 114, i.e., its head with welding surface, which cannot be seen in FIG. 1, is a counter electrode 115 also referred to as anvil, which can be lowered toward the oscillator 117, in order to introduce forces into the joining zones during the welding, in the present case for the formation of passage nodes of conductors or cables.

The anvil 115 is accommodated by a so-called surface plate 119 (see FIG. 2) which can be adjusted perpendicularly to the welding surface 1114 of the sonotrode 114. Opposite, a lateral slide 113 is present, which, with the anvil 115, the sonotrode 114 or its welding surface 1114, and the surface plate 119, delimits a compression space 121 the height and width of which are adjustable.

The converter 112 is connected via a line 118 to a generator 120 which in turn is connected via a line 122 to a computer. Via the generator 120, high-frequency voltage is applied to the converter 112, i.e., to the piezo crystal plates arranged therein, in order to expand or to contract the plates whereby ultrasonic oscillations with an amplitude which is amplified by the booster 116 and transferred to the sonotrode 114 are generated.

The oscillation frequency is typically 20 kHz. The half-wave amplitude is usually between 0.010 mm and 0.045 mm. The forces acting on the cables during the ultrasound welding, which act on the cables from the anvil 115, can be between 150 N and 3000 N. The welding surface extends in the oscillation trough of the ultrasonic oscillations.

Although, based on FIG. 1, a longitudinal oscillator has been explained, the teaching according to the invention is also not exceeded if a torsional oscillator is used.

The ultrasound welding device 111 moreover is usually surrounded by a sound protection housing 126 which is closed during the welding. Purely as an example, such a housing can be obtained from FIG. 5. The sound protection housing 126 here consists of a stationary section 128 and a section 130 which can be moved with respect to said stationary section and which, during the welding, adjoins said stationary section and is in turn surrounded by a housing part 132.

On the bottom side, the housing 126 is closed by a base plate 134, from which the components or tools start or are mounted, which, among other reasons, are necessary for the formation of the compression space 121. Such a compression space can be obtained purely schematically from FIG. 2. One can see the sonotrode 114 with welding surface 1114, the lateral slide 113, the anvil 115 and the surface plate 119 which surround the compression space 121.

Figure 2:
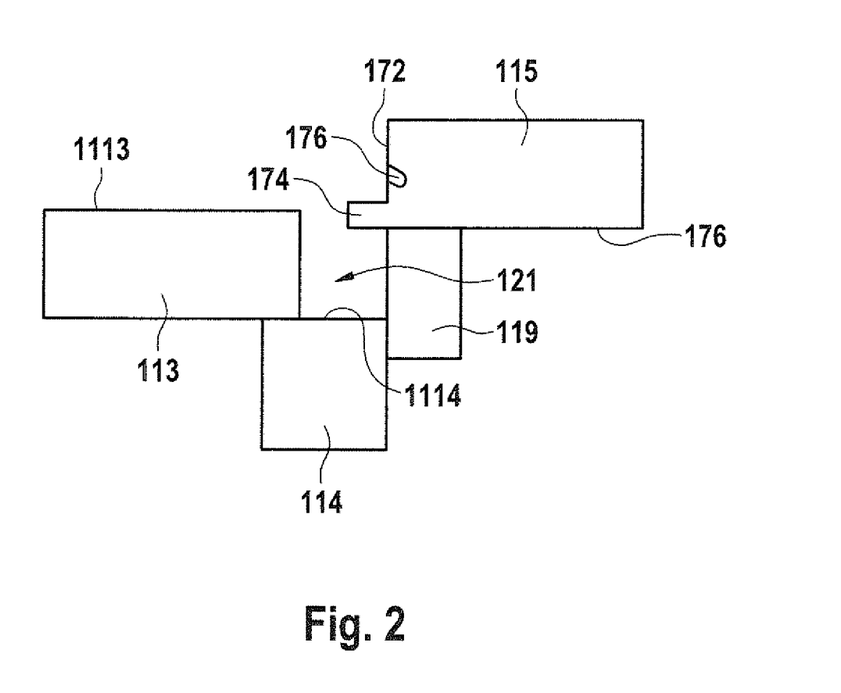
FIG. 2 shows a schematic diagram of a compression space of an ultrasound metal welding device.

The conductors to be welded are introduced into the opened compression space 121, in order then to move the lateral slide 113 in the direction of the surface plate 119 to the desired welding width. Then, the anvil 115 is moved in the direction of the lateral slide 113 with simultaneous lowering by adjustment of the surface plate 119, in order then to weld the conductors after contacting of said conductors with sonotrode 114 excited. To that extent, reference is made to sufficiently known techniques.

Figure 5:
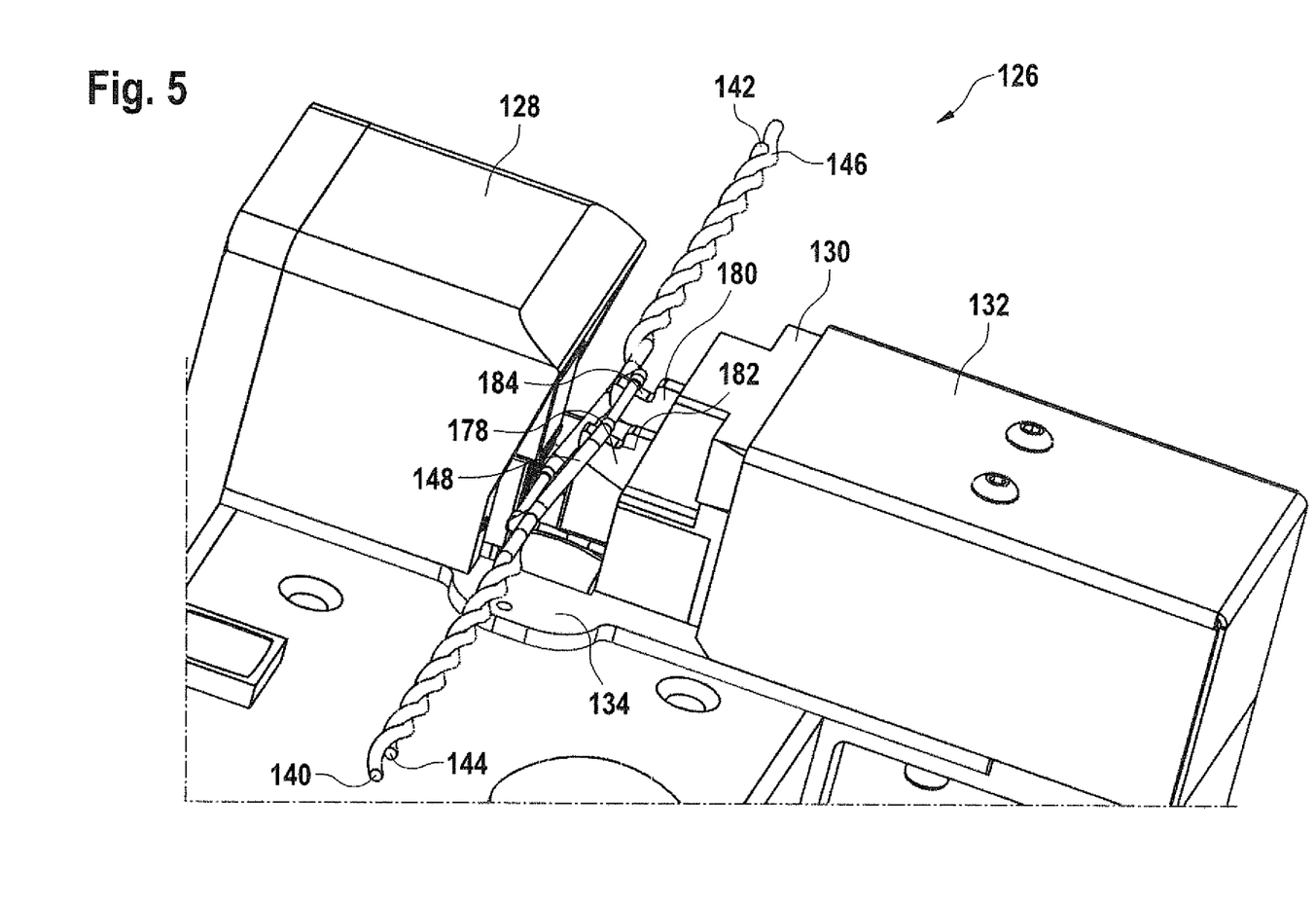
FIG. 5 shows an ultrasound welding device with sound protection housing.
Figure 7:
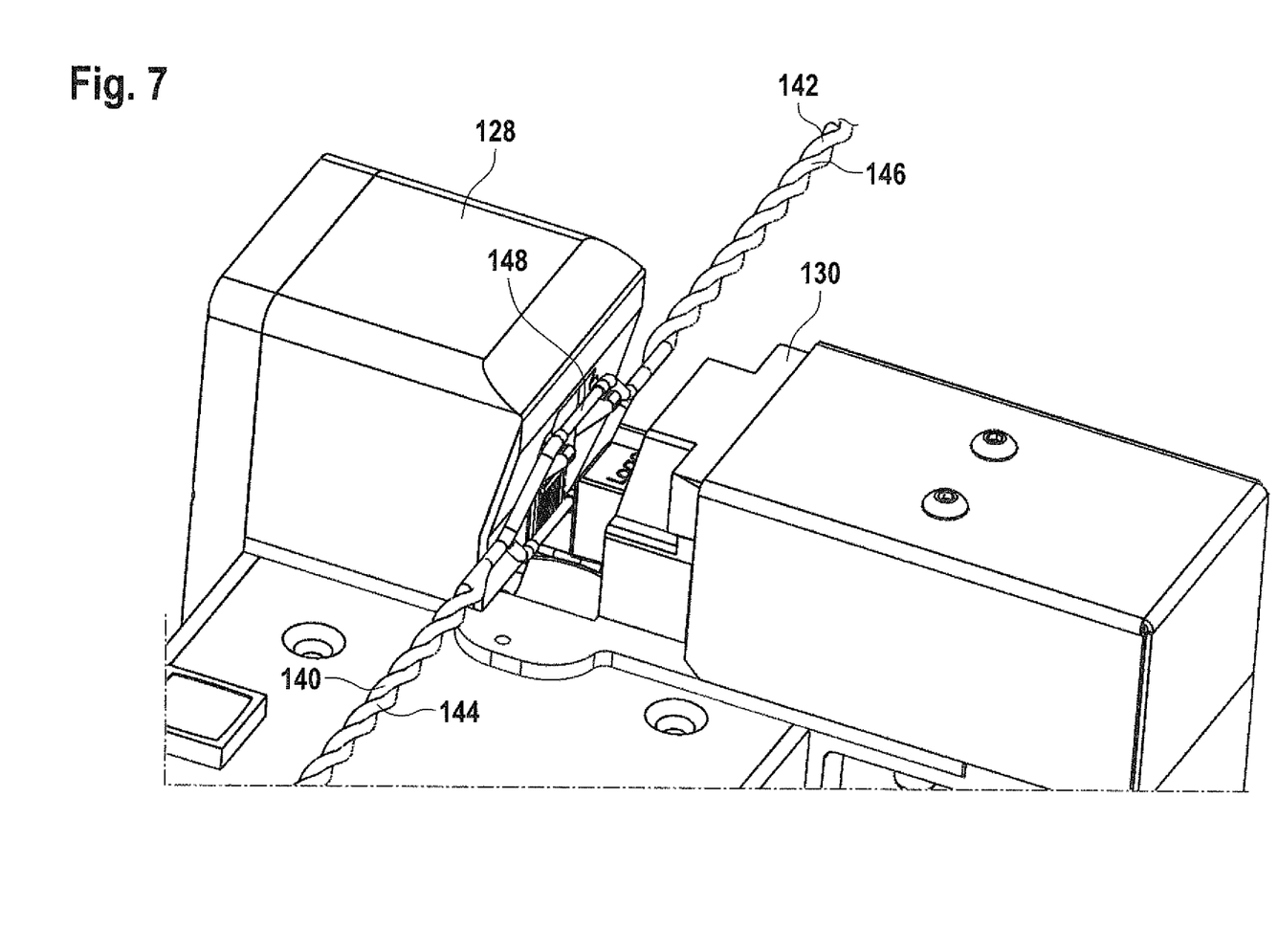
FIG. 7 shows the arrangement according to FIG. 6, in which first conductors of twisted conductors are welded.
Figure 8:
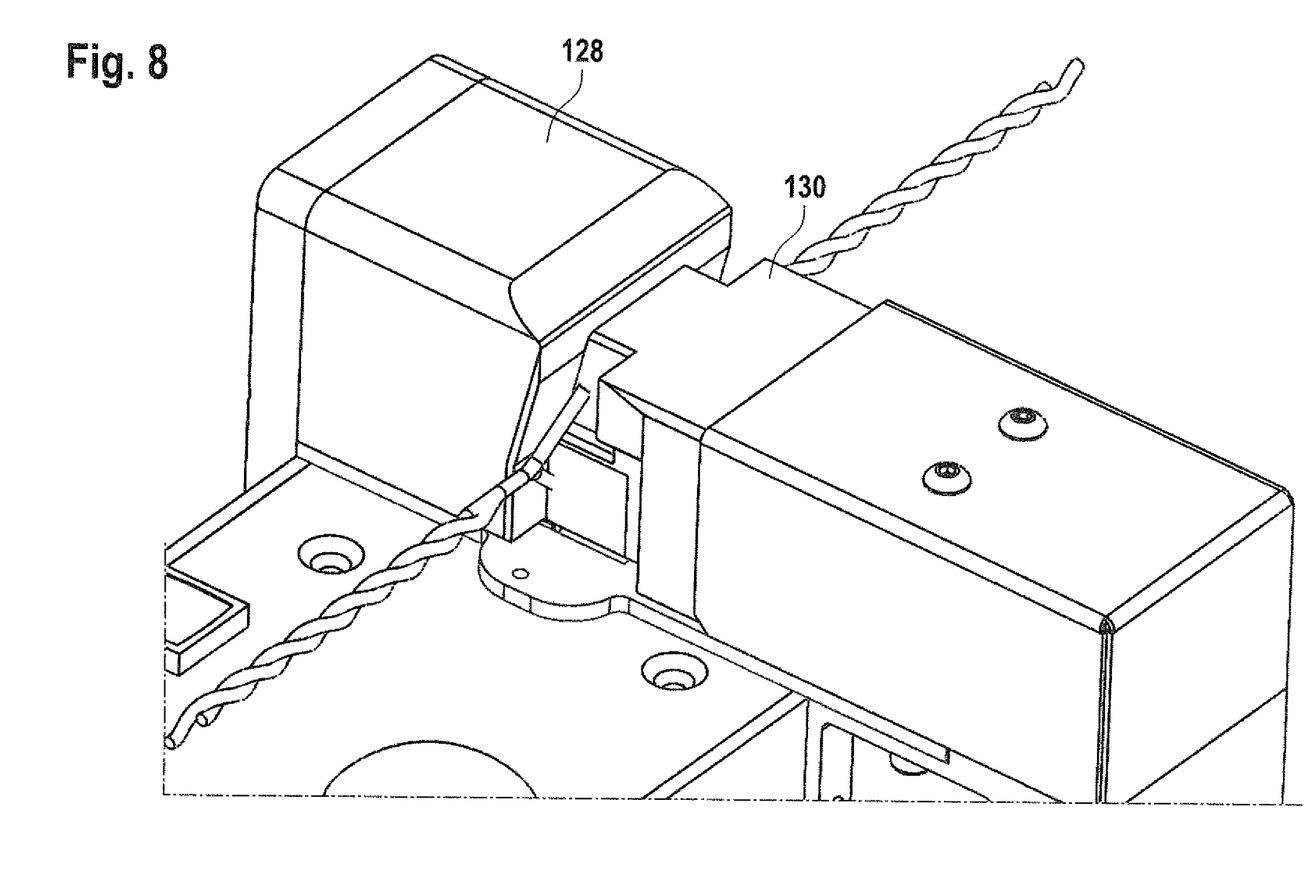
FIG. 8 shows the arrangement according to FIGS. 6 and 7 with closed sound protection housing.

According to the invention, first conductors 140, 142 are welded to one another, and second conductors 144, 146 are welded to one another one after the other. Here, the first conductors 140, 142 are twisted with the second conductors 144, 146, as can be seen in FIGS. 5, 7 and 8.

The welding of the first conductors 140, 142 occurs first. For this purpose, blank ends of the otherwise insulated conductors or cables 140, 142 are introduced into the compression space 121, in order then to shift the lateral slide 113 to the welding width in the above-described manner, in order subsequently to carry out the welding by adjusting anvil 115 and surface plate 119 with sonotrode 114 excited.

The free blank ends of the second conductors 144, 146 are positioned during the insertion of the blank ends of the first conductors 140, 142 so that they cannot penetrate into the compression space 121.

After the welding of the first conductors 140, 142 has occurred, that is to say after production of a first connection 148 to be referred to as passage node, the second conductors 144, 146 are introduced into the compression space 121. Here, it must be ensured that the passage node 148 cannot reach the compression space 121.

This can occur either in that the first and second conductors are untwisted over a longer distance or, on the other hand, according to the teaching of the invention, the passage node 148 is placed or hooked on a retention device which is integrated in the ultrasound welding device 111 and, in particular, within the interior space of the housing 126.

Thus, untwisting in the immediate vicinity of the passage node 148 is only required to a small extent. Consequently, the effect of the twisting is substantially maintained, namely the mutual influencing of the first conductors 140, 142 with respect to the second conductors 144, 146 and vice versa is prevented, an advantage which is reflected not only in communication technology, but also in the sector of motor vehicle technology.

In order to fix the passage node 148 so that the welding of the blank ends of the second conductors 144, 146 cannot be interfered with, different possibilities are given, as is explained in reference to the figures.

A preferred embodiment consists in that the lateral slide 113 acts as retaining device by means of recesses and/or protrusions or other aids. This is explained in reference to FIGS. 3 and 4.

Figure 3A:
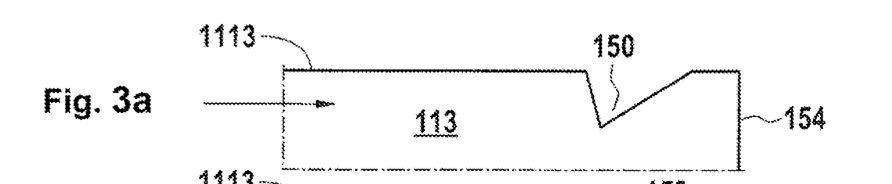
FIG. 3a shows a schematic diagram of a first embodiment of a lateral slide.
Figure 3B:
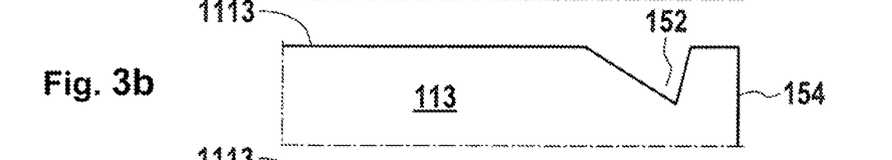
FIG. 3b shows a schematic diagram of a second embodiment of a lateral slide.

Thus, according to the embodiment example of FIGS. 3a and 3b, the lateral slide 113 comprises on its upper side 1113 a recess 150, 152 forming an oblique angled triangle in cross section, the short leg of which according to FIG. 3a extends at a distance from the front surface 154 of the lateral slide 113 or facing same (FIG. 3b).

Irrespective of this, by the depression or recess 150, 152 it is ensured that, during the insertion of the passage node 148, said passage node is fixed during the welding process. The recess or depression 150, 152 extends over the entire width of the lateral slide 113.

Figures 3C, 3D:
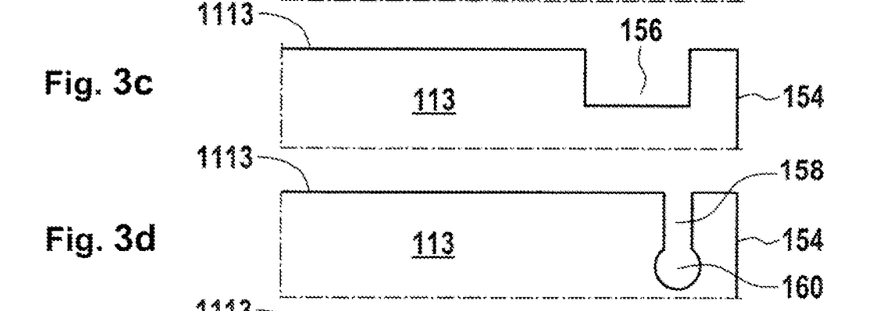
FIG. 3c shows a schematic diagram of a third embodiment of a lateral slide.
FIG. 3d shows a schematic diagram of a fourth embodiment of a lateral slide.

According to the embodiment example of FIG. 3c, a recess 156 of rectangular cross section extending parallel to the front surface 154 is provided as retaining device.

In FIG. 3d, starting from the upper side 1113 and parallel to the front surface 154, a slot 158 extends, which transitions into a widening 160 which is circular in cross section and which is used as retention device.

Figures 3E, 3F:
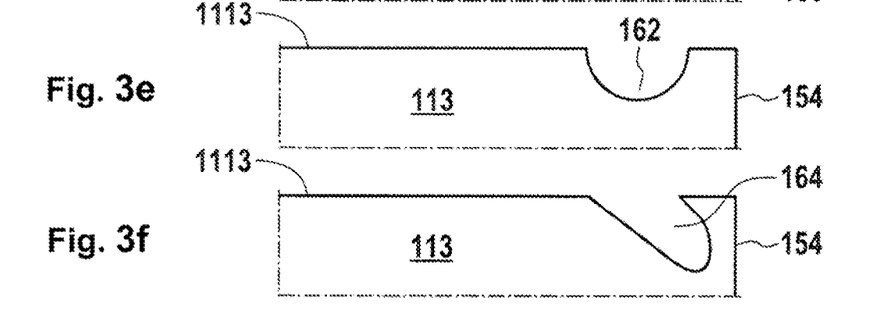
FIG. 3e shows a schematic diagram of a fifth embodiment of a lateral slide.
FIG. 3f shows a schematic diagram of a sixth embodiment of a lateral slide.

According to the embodiment example of FIG. 3e, starting from the upper side 1113 of the lateral slide 113 is a groove-shaped recess 162 which extends over the entire width of the slide 113 and which, in the embodiment example, has the geometry of a semicircle. An additional possibility for forming a retention device in the lateral slide 113 is given by an undercut 164 (FIG. 3f).

Figure 4A:
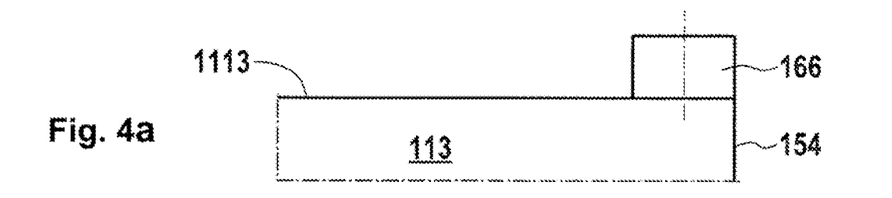
FIG. 4a shows a schematic diagram of a seventh embodiment of a lateral slide.
Figure 4B:
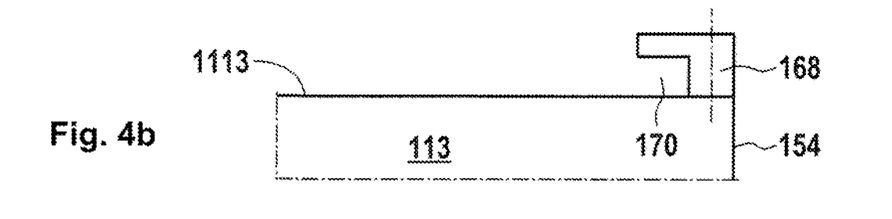
FIG. 4b shows a schematic diagram of an eighth embodiment of a lateral slide.

However, the function of a retention device is also achieved by protrusions 166 or 168 starting from the upper side 1113 (FIG. 4a, b). The protrusion 166, which does not necessarily have to extend over the entire width of the slide 113, has a rectangular geometry in cross section and, according to FIG. 4b, the shape of an L in cross section, so that a free space 170 facing away from the front surface 154 results, into which the passage node 148 can be inserted or hooked.

However, a retention device can also be formed in the anvil. This is illustrated using FIG. 2. Thus, a protrusion 174 can start from the front surface 172 of the anvil 115, which extends on the slide side, so that, between the front surface 172 and the protrusion 174, a step is formed, on which the passage node 148 can be placed. In order not to influence the welding process, the protrusion 174 transitions flush on the sonotrode side into the lower side 176 of the anvil 115, which in sections delimits the compression space 121.

In other words, the protrusion 174 is a section of the anvil 115 or of the pressure surface itself. Instead of a protrusion, in the front surface 172, for example, a recess 176 can be provided, into which the first connection or passage node 148 is hooked during the welding of the blank ends of the second conductors 144, 146.

However, according to FIG. 5, the possibility also exists that a retention device starts from the adjustable housing section 130. In the embodiment example, starting from the housing section 130 are webs or arms 178, 180 which comprise upper sides 182, 184 of hook-shaped design into which the first connection or the passage node 148 is inserted during the welding of the second conductors 144, 146. The arms 180 here extend to the side of the lateral slide 113 and thus to the side of the compression space 121.

Figure 6:
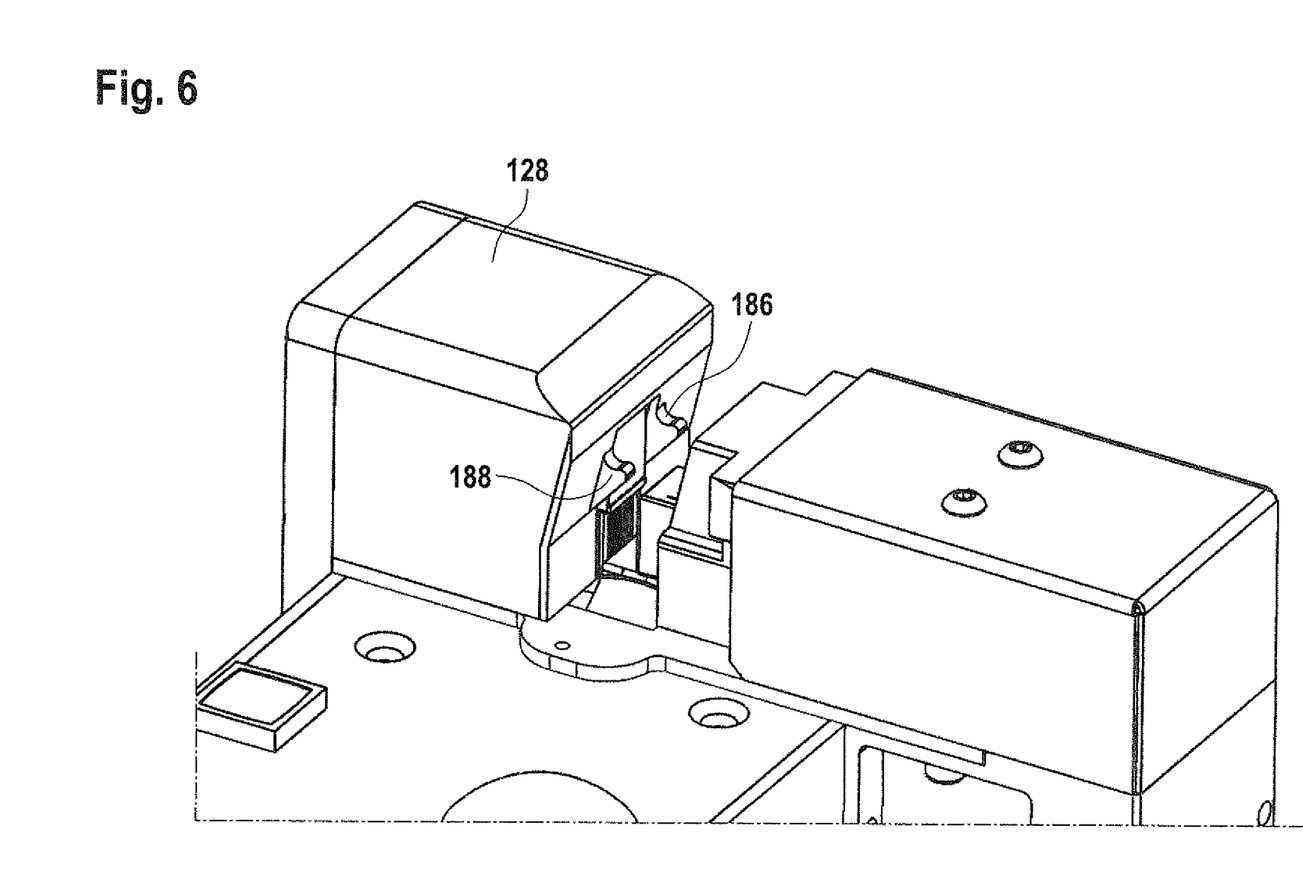
FIG. 6 shows an ultrasound welding device according to FIG. 5 with a sound protection housing of different design.

According to the embodiment example of FIGS. 6 to 8, starting from the stationary housing section 128 are hook-shaped protrusions 186, 188 which are used as retention device. The protrusions 186, 188 here have a slight spacing which ensures that the adjustment of the lateral slide 113 cannot be impeded.

In FIG. 6, the opened housing is represented. In FIG. 7, the welding of the blank ends of the first conductors 140, 142 has already occurred. The produced first connection, that is to say the first passage node 148, is placed on the hook-shaped sections 186, 188, so that the blank ends of the second conductors 144, 146 can then be welded. During the welding itself, the housing 126 is closed, as can be obtained from FIG. 8. Here, a front surface of the adjustable section 130 adjoins a geometrically matched surface of the housing section 128.

Irrespective of this, in order to be able to lead the first and second conductors 140, 142 or 144, 146 out of the housing 126, the adjustable section 130 in particular has, on the front margin-side, a corresponding yielding material preferably consisting of foam, as can be obtained from FIG. 8.

Additional embodiments of retention devices can be obtained from FIGS. 9 to 14. These embodiments here relate to the retention devices that start from the housing 126 or the sections 128, 130. Basically, they are designs of the retention devices 178, 180, 182, 184 of the adjustable section 130 or of the retention devices 186, 188 of the stationary section 128.

Figure 9:
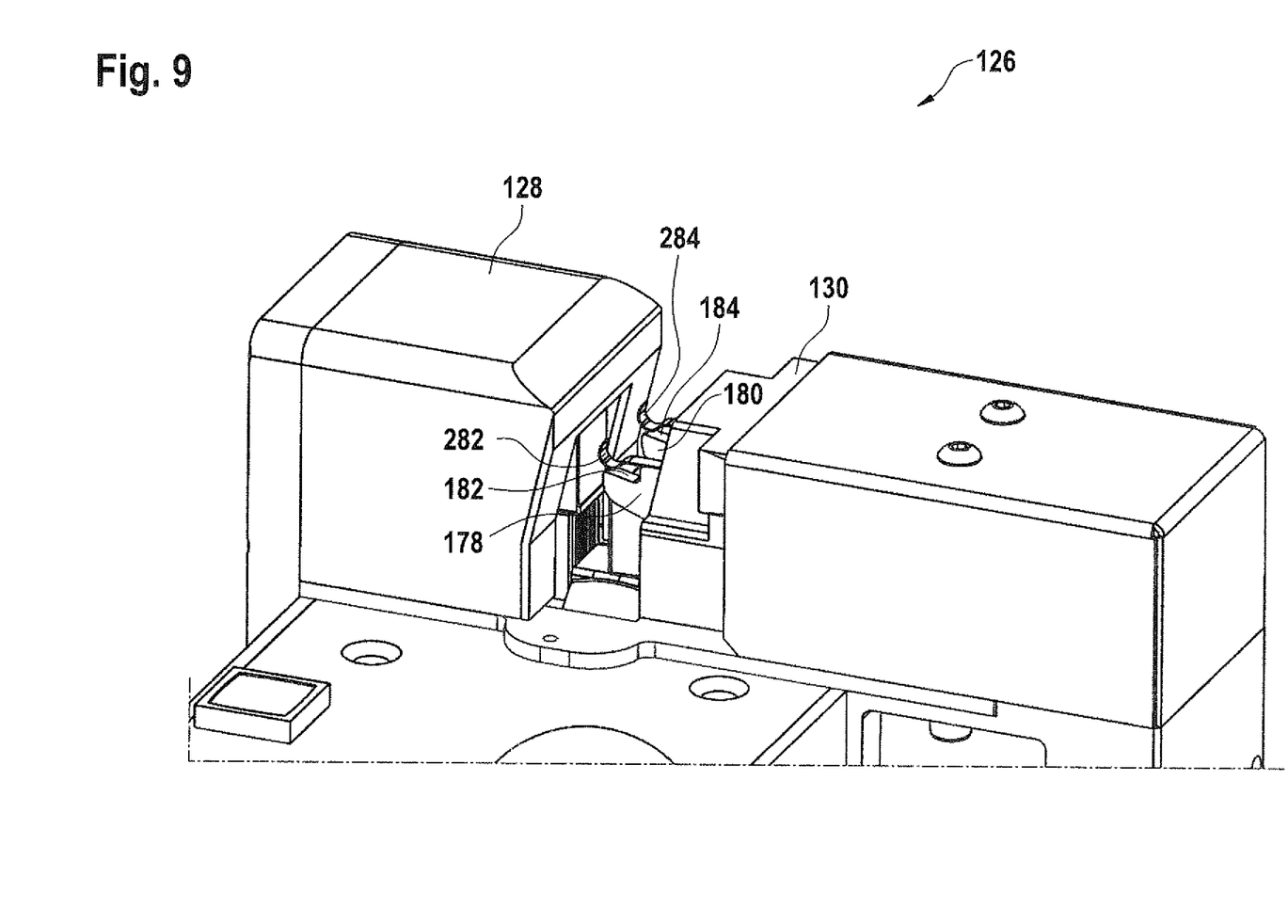
FIG. 9-14 show additional embodiments of retention devices.
Figure 10:
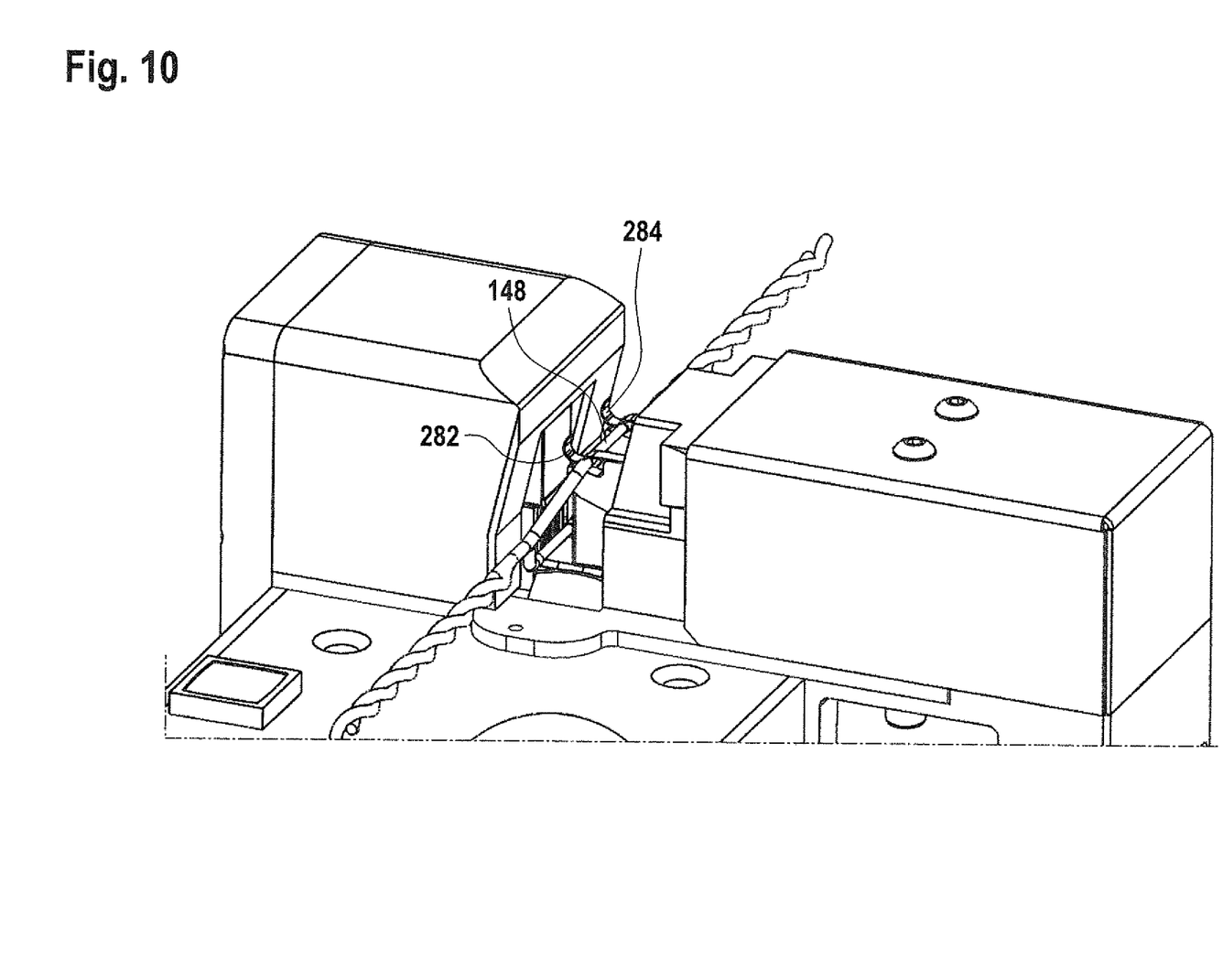

In FIGS. 9 and 10, along the hook-shaped upper sides 182, 184, in each case a spring-like element 282, 284 extends, and between them and the upper side 182, 184 of the arm 178, 180, the first connection 148 can be clamped, as can be obtained from FIG. 10.

Figure 11:
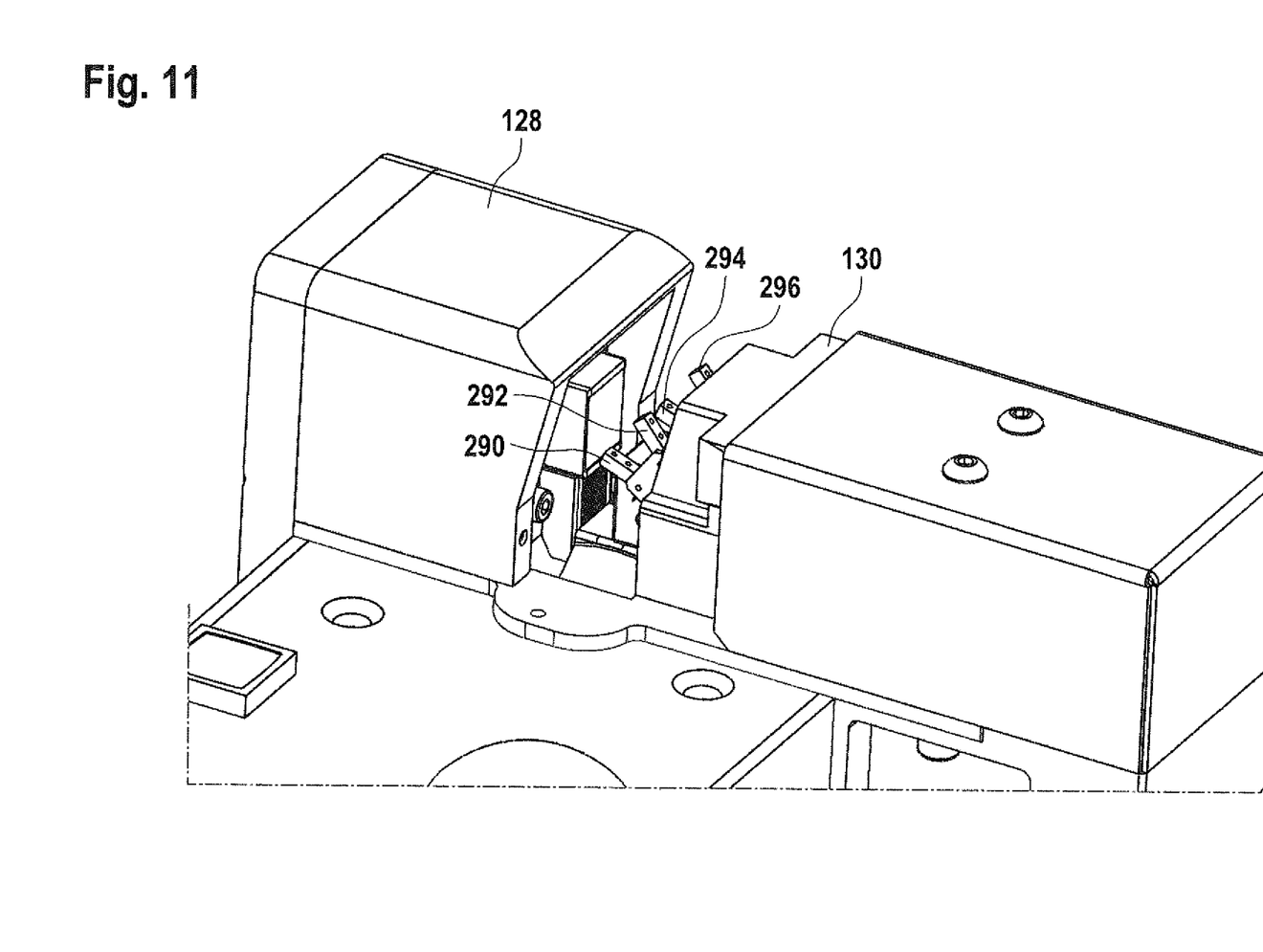
Figure 12:
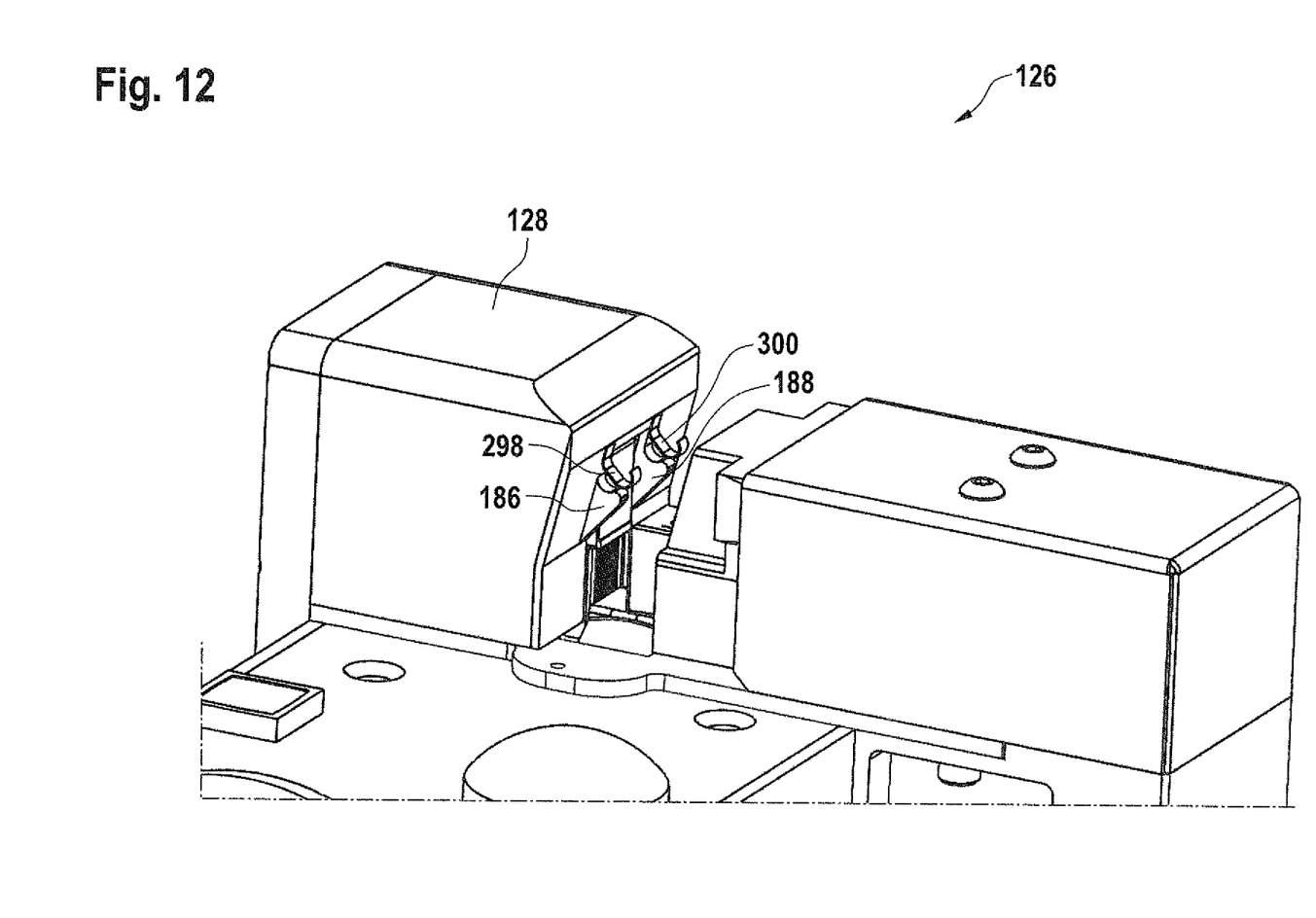
Figure 13:
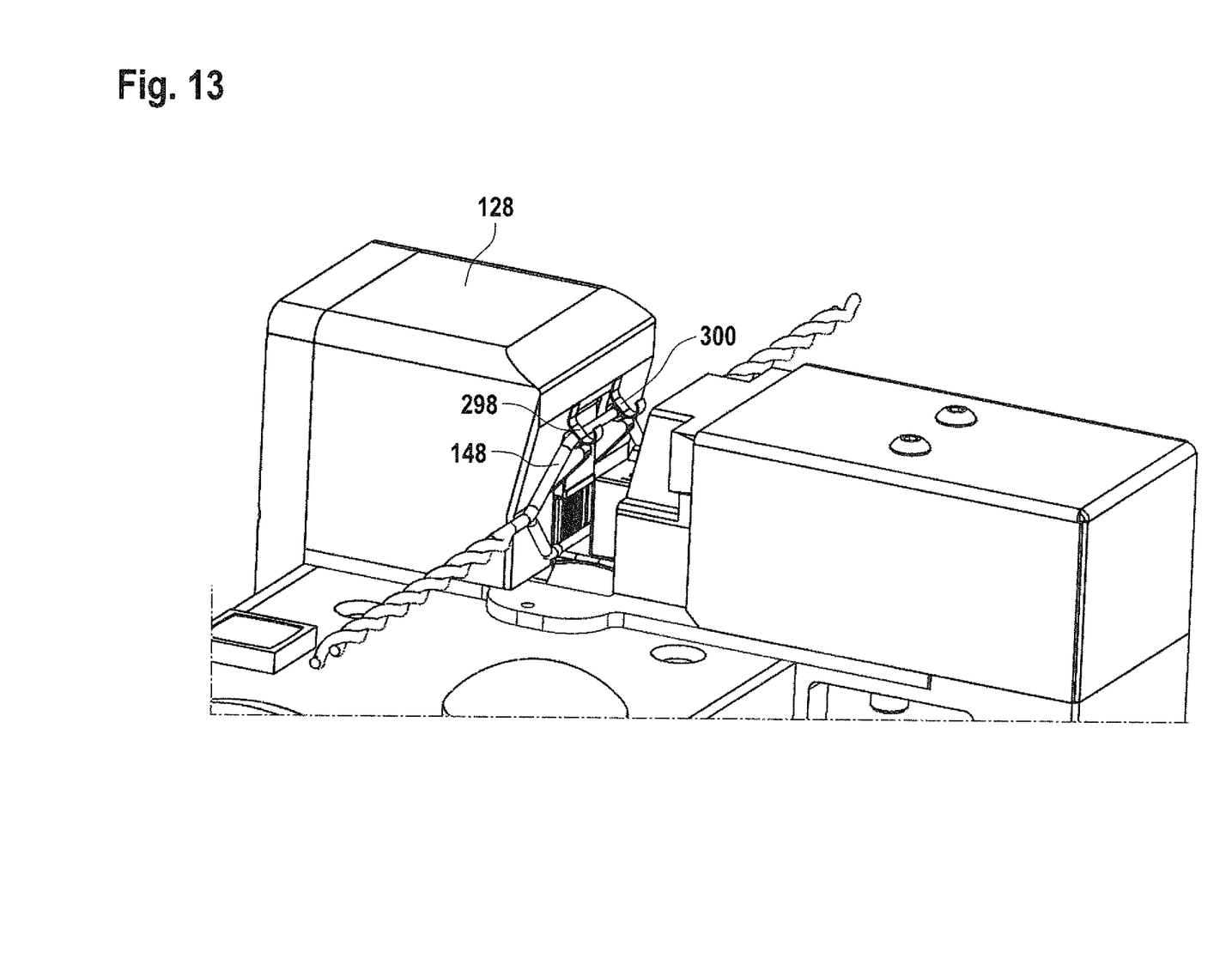

According to an embodiment example of FIG. 11, in each case, along each longitudinal side surface of the slide 113, a gripping device comprising in each case two arms 290, 292 or 294, 296 extends, between which a passage node, that is to say, in the embodiment example, the first connection 148, is clamped, in order to then carry out the welding of the second conductors.

However, retention devices according to the designs of FIGS. 9 to 11 can also start from the stationary section 128 of the housing 126. Thus, spring-like clamping elements 298, 300 are associated with the hook-shaped protrusions 186, 188, and between them and the upper sides of the protrusions 186, 188, a passage node can be clamped, as can be obtained from FIG. 13.

Figure 14:
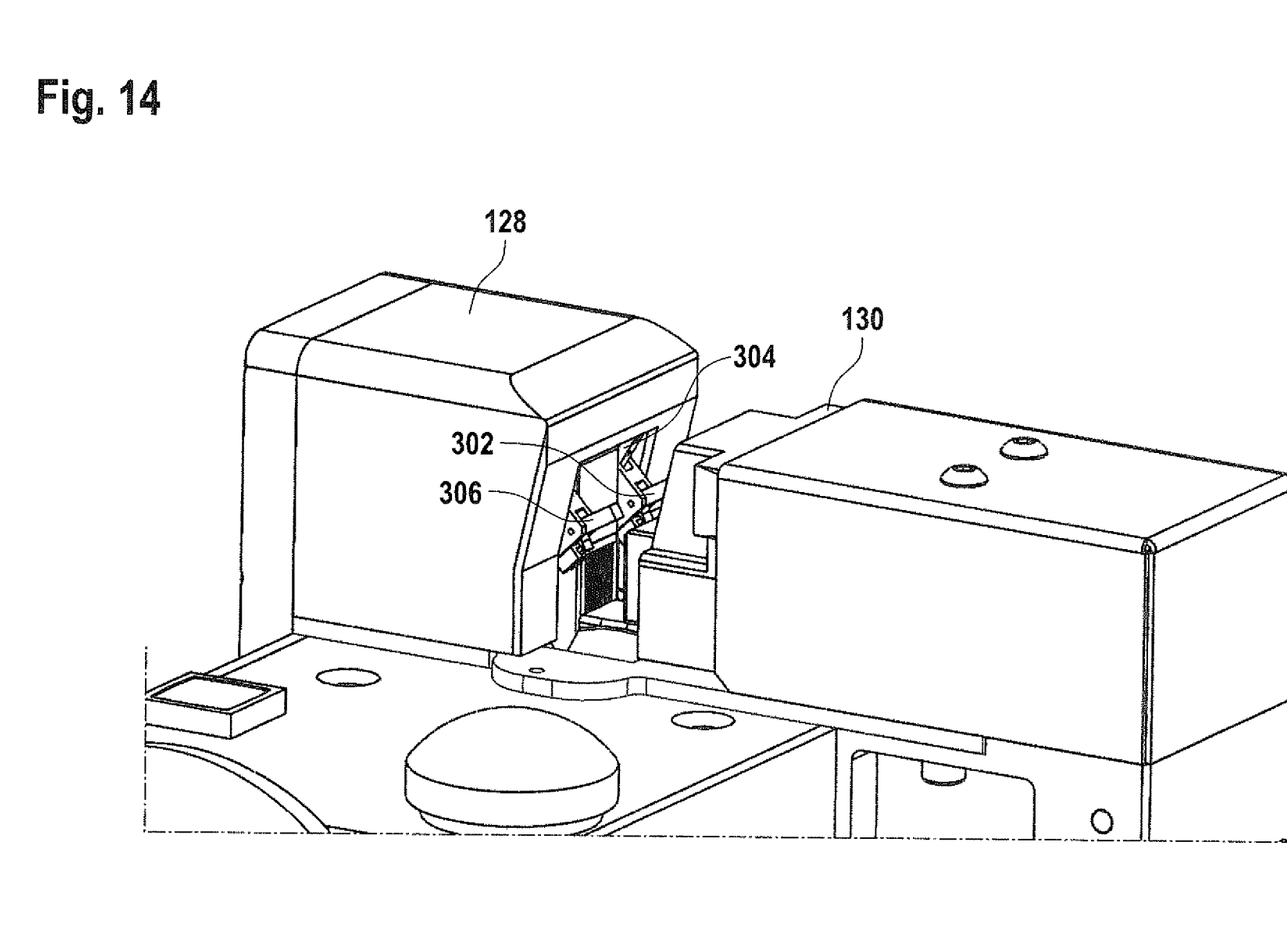

FIG. 14 provides a gripping device as retention device in accordance with FIG. 11, i.e., in each case a pair of arms 302, 304 and 306 that can be pivoted with respect to one another as well as an additional arm that cannot be seen are adjustable with respect to one another, in order to accommodate a passage node in a clamping manner.

It should be noted that the method according to the invention can also be carried out when more than two connections are to be welded, that is to say when more than first and second lines are to be welded. Thus, the retention device can consequently be designed so that multiple connections, passage nodes are accommodated. It would be possible to provide more than one retention device for accommodating connections, in order to keep said connections away from the compression space.

What is claimed is:

1. A device for connecting first conductors and second conductors by ultrasonic welding, comprising:
   at least one lateral slide, a sonotrode, and a counter electrode defining a compression space;
   wherein the compression space is configured for welding first electric conductors to form a first connection by ultrasonic welding, and for welding second electric conductors to form a second connection by ultrasonic welding; and
   a retention device located outside the compression space when the first and the second electric conductors are welded;
   wherein the retention device is provided on an upper side surface of the at least one lateral slide, or on the counter electrode, or, if a housing is present surrounding the compression space, the retention device extends from the interior of the housing, or from an element closing a bottom side of the housing;
   wherein the retention device is configured to keep the first connection out of the compression space when the second electric conductors are welded, and
   wherein the retention device is formed as a recess.

2. The device according to claim 1, wherein the retention device is formed distal to a bottom surface of the compression space.

3. The device according to claim 1, wherein the recess has a cross sectional geometry in the form of a member selected from the group consisting of a triangle, a non-isosceles triangle, a rectangle, a segment of a circle, a semicircle, and a combination thereof, in a cross section taken perpendicular to a front surface of the at least one lateral slide.

4. The device according to claim 1, wherein the recess is formed as an undercut.

5. The device according to claim 1, wherein a protrusion having a rectangular- or L-shape in cross section extends from an upper side of the at least one lateral slide; and
   wherein a surface of the protrusion facing the compression space transitions flush with a surface of the at least one lateral slide that delimits the compression space.

6. The device according to claim 1, wherein the retention device is formed as a recess in a front surface of the counter electrode that faces the at least one lateral slide, or as a protrusion extending from the front surface of the counter electrode.

7. The device according to claim 6, wherein a lower surface of the protrusion transitions flush into a lower surface of the counter electrode, so that a section of the lower surface of the counter electrode delimits the compression space.

8. The device according to claim 1, wherein the housing comprises a first section and a second section which is adjustable with respect to said first section.

9. The device according to claim 8, wherein two mutually spaced retention devices extend on opposite sides of the compression space, when the housing is in a closed position.

10. The device according to claim 1, comprising a plurality of retention devices.

11. The device according to claim 1, wherein the housing comprises a base plate, and wherein the retention device extends from the base plate.

* * * * *